US010414247B2

(12) United States Patent
Jee et al.

(10) Patent No.: US 10,414,247 B2
(45) Date of Patent: Sep. 17, 2019

(54) AIR BLOWER DEVICE OF AIR-CONDITIONING SYSTEM FOR VEHICLE HAVING ELECTRIC DUST COLLECTOR AND CONTROLLING METHOD THEREOF

(71) Applicant: Hanon Systems, Daejeon-si (KR)

(72) Inventors: Yong Jun Jee, Daejeon-si (KR); Ji Yong Park, Daejeon-si (KR)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 15/122,688

(22) PCT Filed: Nov. 30, 2015

(86) PCT No.: PCT/KR2015/012916
§ 371 (c)(1),
(2) Date: Aug. 31, 2016

(87) PCT Pub. No.: WO2016/111465
PCT Pub. Date: Jul. 14, 2016

(65) Prior Publication Data
US 2018/0162201 A1    Jun. 14, 2018

(30) Foreign Application Priority Data

Jan. 6, 2015   (KR) .................. 10-2015-0001421
Feb. 12, 2015  (KR) .................. 10-2015-0021614

(51) Int. Cl.
*B60H 3/00*    (2006.01)
*B03C 3/41*    (2006.01)
(Continued)

(52) U.S. Cl.
CPC ............. *B60H 3/0078* (2013.01); *B03C 3/41* (2013.01); *B03C 3/68* (2013.01); *B60H 3/0608* (2013.01);
(Continued)

(58) Field of Classification Search
CPC combination set(s) only.
See application file for complete search history.

(56) References Cited

U.S. PATENT DOCUMENTS 4,597,323 A * 7/1986 Mordau ............. B60H 1/00028
454/147
4,925,468 A * 5/1990 Kishi ................. B01D 46/0006
55/467

(Continued)

FOREIGN PATENT DOCUMENTS

JP    2004-258937    9/2004
KR    20040080321 A  9/2004
(Continued)

*Primary Examiner* — Prem C Singh
*Assistant Examiner* — Sonji Turner
(74) *Attorney, Agent, or Firm* — Shumaker, Loop & Kendrick, LLP; James D. Miller

(57) ABSTRACT

An air blower device of an air-conditioning system for a vehicle including: a blower case including a duct part having an indoor air inlet and an outdoor air inlet, an air blowing part connected with an inlet of an air-conditioning case and a connection part for connecting the duct part with the air blowing part, the connection part having an insertion part of which the certain area is hollowed; an indoor and outdoor air converting door disposed inside the duct part of the blower case to open and close the indoor air inlet and the outdoor air inlet; an air blower is disposed inside the air blowing part of the blower case to forcedly blow air; an electric dust collector located at the connection part through the insertion part of the blower case; and a cover for opening and closing the insertion part of the blower case.

12 Claims, 18 Drawing Sheets

(51) Int. Cl.
  *B03C 3/68* (2006.01)
  *B60H 3/06* (2006.01)
  *B60H 1/00* (2006.01)

(52) U.S. Cl.
  CPC ............... *B03C 2201/30* (2013.01); *B60H 2001/00085* (2013.01); *B60H 2003/0675* (2013.01)

(56) References Cited

U.S. PATENT DOCUMENTS

| | | | | |
|---|---|---|---|---|
| 5,256,104 A * | 10/1993 | Arold | ............... | B60H 3/0608 454/158 |
| 5,368,620 A * | 11/1994 | Chiba | ............... | B03C 3/363 454/146 |
| 5,454,859 A * | 10/1995 | Chiba | ............... | B03C 3/363 55/385.3 |
| 5,501,716 A * | 3/1996 | Chiba | ............... | B03C 3/363 55/309.1 |
| 6,585,792 B2 * | 7/2003 | Schneider | ............... | B01D 46/0005 55/385.2 |
| 7,013,656 B2 * | 3/2006 | Yanagimachi | ............... | B60H 1/00742 165/202 |
| 7,238,225 B2 * | 7/2007 | Hong | ............... | B03C 3/47 96/69 |
| 9,321,324 B2 * | 4/2016 | Omi | ............... | B60H 1/00592 |
| 9,475,362 B2 * | 10/2016 | Richter | ............... | B60H 1/3233 |
| 9,555,693 B2 * | 1/2017 | Hopf | ............... | B60H 3/0616 |
| 9,669,683 B2 * | 6/2017 | Kemmerling | ............... | B60H 3/0616 |
| 2004/0172927 A1 | 9/2004 | Lee | | |
| 2006/0070526 A1 * | 4/2006 | Hong | ............... | B03C 3/47 96/69 |

FOREIGN PATENT DOCUMENTS

| | | |
|---|---|---|
| KR | 1020040078009 A | 9/2004 |
| KR | 1020040080321 A | 9/2004 |
| KR | 100505276 A | 7/2005 |
| KR | 20080035301 A | 4/2008 |
| KR | 1020080035301 A | 4/2008 |
| KR | 1020110131914 A | 12/2011 |

* cited by examiner

AIR BLOWER DEVICE OF AIR-CONDITIONING SYSTEM FOR VEHICLE HAVING ELECTRIC DUST COLLECTOR AND CONTROLLING METHOD THEREOF

CROSS-REFERENCE TO RELATED PATENT APPLICATIONS

This patent application is a United States national phase patent application based on PCT/KR2015/012916 filed Nov. 30, 2015, which claims the benefit of Korean Patent Application No. 10-2015-0001421 filed Jan. 6, 2015 and Korean Patent Application No. 10-2015-0021614 filed Feb. 12, 2015, the disclosures of which are hereby incorporated herein by reference in their entirety.

TECHNICAL FIELD

The present invention relates to an air blower device of an air-conditioning system for a vehicle having an electric precipitator and a controlling method thereof, and more particularly, to an air blower device of an air-conditioning system for a vehicle, which includes an electric dust collector inserted into an insertion part of a blower case and is capable of being opened and closed by a cover so as to effectively enhance comfort of the vehicle by an electric dust collection filter without any transformation of the existing blower case, and which supplies electric power to a filter unit of the electric dust collector after checking a driver's approach so as to prevent that dust collected in the filter unit is supplied to the interior of the vehicle when being removed from the filter unit, and a controlling method thereof.

BACKGROUND ART

An air conditioner for a vehicle is an apparatus which inhales indoor air and outdoor air of a vehicle and cools or heats the inhaled air through a heat exchanger and blows the heat-exchanged air to the interior of the vehicle so as to maintain the interior of the vehicle at a proper temperature in the summer season or the winter season or to secure a driver's front and rear visual fields by removing frost from windows of the vehicle in the rainy season or the winter season.

In the meantime, the interior of the vehicle is easy to be polluted because it is small and sealed, and is more polluted because of fine dust and various pollutants in downtown areas. Particularly, due to a continuous increase in a distribution rate of vehicles and an increase of the time when people are inside vehicles, studies for maintaining comfort of the interior of the vehicle have been making.

As an example for showing purification of the interior of a vehicle, Korean Patent Laid-open No. 10-2004-97758 discloses an air cleaner for a vehicle which sterilizes microorganisms collected during an air cleaning process so as to make flow in cleaner air to the interior of the vehicle. As shown in FIG. 1, the air cleaner for a vehicle includes: a case 50 which has a suction port 51 and an exhaust port 52; a first filter 60 which is mounted in rear of the suction port 51 to collect foreign matters or dust; an electrostatic dust collector 70 for adsorbing fine dust using electrical discharge; a second filter 90 which is mounted in front of the exhaust port 52 of the case 50 and is coated with photocatalyst to decompose organic materials and sterilize harmful microorganisms; and an ultraviolet lamp 80 which is mounted between the electrostatic dust collector 70 and the second filter 90 to activate the photocatalyst of the second filter 90.

Such an air cleaner for the vehicle sterilizes harmful microorganisms using the photocatalyst activated by ultraviolet rays of the ultraviolet lamp and removes causes of bad smell through decomposition of organic materials. The air flown in through the suction port 51 of the case 50 is filtered while passing through the first filter 60. The first filter 60 mainly filters coarse-grained dust. The first filtered air flows into the electrostatic dust collector 70. When electricity is supplied through a power supply unit 73, fine dust particles charged by a discharge electrode 71 are adsorbed to a dust collection electrode 72. Therefore, the fine dust passing the first filter is removed by the electrostatic dust collector 70. While the air passing through the electrostatic dust collector 70 flows to the second filter 90, microorganisms, such as germs or molds, contained in the air are sterilized by ultraviolet rays radiated from the ultraviolet lamp 80. Moreover, the second filter 90 decomposes organic materials, such as ammonia, using the photocatalyst activated by the ultraviolet rays radiated from the ultraviolet lamp 80 so as to prevent generation of bad smell and to sterilize and remove harmful microorganisms, such as germs or molds, contained in the collected fine dust. Therefore, the air exhausted through the exhaust port 52 of the case 50 becomes purified air from which dust and harmful microorganisms are removed.

That is, the air cleaner for the vehicle uses filters of various kinds to which fine dust is collected or complexly uses the filters and an ultraviolet lamp for sterilization.

However, the filters for collecting fine dust are divided into a filter for filtering particles above specific diameter using a dust filter, a filter for collecting germs, molds and bad smell generation factors using an activated carbon filter, and a filter for collecting dust after discharging electricity so that dust has specific electric charge.

The first and second filters need to be replaced with new filters because removing dust by dust collection. However, the third filter of the electrostatic dust collection type does not need to be replaced with a new one and can effectively remove even small-sized particles.

FIG. 2 illustrates dust collection of the electrostatic dust collector 70 which is the filter of the electrostatic dust collection type. In FIG. 2, the electrostatic dust collector 70 includes: an electric charge unit 71 which has a discharge board 71a and a discharge pin 71b for charging dust (D) with electricity by corona discharge; and a dust collection unit 72 for collecting the dust (D') charged through the electric charge unit 71.

However, the electrostatic dust collector illustrated in FIG. 2 generates electromagnetic noise and ozone at a sharp end portion of the electric discharge pin due to electric charge by corona discharge. Because electromagnetic noise interrupts operation of various devices inside the vehicle and ozone is harmful to human bodies, the electrostatic dust collector needs additional means for removing electromagnetic noise and ozone.

Korean Patent No. 10-0505276 (entitled "Air cleaner for vehicle published on Nov. 18, 2004)

Technical Problem

Accordingly, the present invention has been made in an effort to solve the above-mentioned problems occurring in the prior arts, and it is an object of the present invention to provide an air blower device of an air-conditioning system for a vehicle which includes an electric dust collector inserted into an insertion part of a blower case and is capable of being opened and closed by a cover so as to effectively enhance comfort of the vehicle by an electric dust collection filter without any transformation of the existing blower case.

It is another object of the present invention to provide an air blower device of an air-conditioning system for a vehicle in which an electric dust collector capable of preventing generation of ozone harmful to human bodies and collecting fine dust is easy to be detachably mounted to a blower case and which allows a user to easily inspect and to easily replace the filter with a new one.

It is a further object of the present invention to provide a method of controlling an electric dust collector for a vehicle which supplies electric power to a filter unit of the electric dust collector after checking a driver's approach so as to prevent that dust collected in the filter unit is supplied to the interior of the vehicle when being removed from the filter unit, thereby enhancing a passenger's comfort more.

To achieve the above objects, the present invention provides an air blower device of an air-conditioning system for a vehicle including: a blower case which includes a duct part having an indoor air inlet and an outdoor air inlet, an air blowing part connected with an inlet of an air-conditioning case and a connection part for connecting the duct part with the air blowing part, the connection part having an insertion part of which the certain area is hollowed; an indoor and outdoor air converting door which is disposed inside the duct part of the blower case to open and close the indoor air inlet and the outdoor air inlet; an air blower which is disposed inside the air blowing part of the blower case to forcedly blow air; an electric dust collector which is located at the connection part through the insertion part of the blower case; and a cover for opening and closing the insertion part of the blower case. The electric dust collector is inserted into the insertion part of the blower case and is capable of being opened and closed by the cover, thereby enhancing comfort of the vehicle by the electric dust collection filter without transformation of the existing blower case.

The electric dust collector includes a filter unit, an electric charger unit arranged at the upper side of the filter unit, and a high voltage supply unit for applying high voltage to the filter unit and the electric charger unit.

Moreover, the air blower device of the air-conditioning system for the vehicle includes an electric charger unit mounted on the blower case, and the electric dust collector includes a filter unit for collecting dust charged with electricity through the electric charger unit and a high voltage supply unit for applying high voltage to the electric charger unit and the filter unit.

Furthermore, the high voltage supply unit has a connector for connecting electric power to the vehicle at ordinary times.

In this instance, the cover has a hollow hole of which the certain area is hollowed so that the high voltage supply unit of the electric dust collector protrudes to the outside of the blower case. That is, in a state where the insertion part is closed, because the electric charger unit is exposed to the outside through the hollow hole, the electric dust collector can be mounted without transformation of the existing blower case and it is easy to connect electric power to the high voltage supply unit.

Additionally, the air blower device of the air-conditioning system for the vehicle includes a fixing part formed on the blower case or the cover so that the blower case and the cover are fixed to each other.

Particularly, the air blower device of the air-conditioning system for the vehicle includes: a coupling hole formed at one side of the blower case; a protrusion part formed at one side of the cover to correspond with the coupling hole; and a fixing part formed at the other side of the blower case or the cover, so that the blower case and the cover are fixed to each other by the fixing part when the protrusion part of the cover rotates on an axis of a portion where the protrusion part is inserted into the coupling hole.

In more detail, in connection with the electric dust collector, the filter unit includes: a filter housing; and a filter member which is formed in such a way that a plurality of dust collection plates respectively having conductive surfaces are laminated in many folds and is formed such that air can move inside the filter housing. The electric charger unit includes: an electric charger housing; a first electrode part mounted inside the electric charger housing; and a second electrode part mounted to be spaced apart from the first electrode part inside the electric charger housing.

Particularly, the first electrode part has a plurality of through holes formed in a flat board of a conductive material, and the second electrode part includes: a frame; and an electric charge pin protruding from the frame toward the center of the through holes of the first electrode part.

Moreover, the high voltage supply unit can apply high voltage to another high voltage using device mounted in the vehicle. That is, the high voltage supply unit can simplify configuration of vehicle parts because applying high voltage to units requiring high voltage, for instance, an anion generator, as well as being used for the electric dust collector.

Furthermore, the filter housing and the electric charger housing may be formed integrally in the electric dust collector.

In another aspect of the present invention, there is provided a controlling method of an electric dust collector of an air blower device of an air-conditioning system for a vehicle including the steps of: determining a driver's approach; and supplying electric power to a filter unit when it is determined that the driver approaches the vehicle in the approach determining step, so that it is prevented that the dust collected to the filter unit is supplied to the interior of the vehicle because the dust collected to the filter unit is detached from the filter unit.

Additionally, the approach determining step determines that the driver approaches the vehicle when a key sensor disposed in the vehicle is sensed.

Moreover, the approach determining step determines that the driver approaches the vehicle when a vehicle door is opened.

Furthermore, after the filter unit power supplying step, the controlling method of the electric dust collector for the vehicle further includes the steps of: checking a running state and a stopped state of the vehicle; and cutting off power supply to the filter unit when it is checked that the vehicle is stopped after running in the driving checking step.

As described above, the air blower device of the air-conditioning system for the vehicle according to the present invention includes the electric dust collector inserted into the insertion part of the blower case and is capable of being opened and closed by the cover so as to effectively enhance comfort of the vehicle by an electric dust collection filter without any transformation of the existing blower case.

Particularly, the air blower device of the air-conditioning system for the vehicle according to the present invention has several advantages in that the electric dust collector capable of preventing generation of ozone harmful to human bodies and collecting fine dust is easy to be detachably mounted to the blower case and allows the user to easily inspect and to easily replace the filter with a new one.

Furthermore, the air blower device of the method of controlling the electric dust collector for a vehicle which supplies electric power to a filter unit of the electric dust collector after checking a driver's approach so as to prevent that dust collected in the filter unit is supplied to the interior of the vehicle when being removed from the filter unit, thereby enhancing a passenger's comfort more.

EXPLANATION OF REFERENCE NUMERALS IN DRAWINGS

| | |
|---|---|
| 1000: air blower device of air-conditioning system for vehicle | |
| 100: blower case | 101: coupling hole |
| 110: duct part | 111: indoor air inlet |
| 112: outdoor air inlet | |
| 120: air blowing part | |
| 130: connection part | 131: insertion part |
| 200: indoor and outdoor air converting door | |
| 300: blower part | |
| 400: electric dust collector | |
| 410: filter unit | 411: filter housing |
| 412: filter member | |
| 420: electric charger unit | |
| 421: electric charger housing | |
| 422: first electrode part | 422a: through hole |
| 423: second electrode part | 423a: frame |
| 423b: electric charge pin | |
| 430: high voltage supply unit | 431: connector |
| 500: cover | 501: hollow hole |
| 510: fixing part | 520: protrusion part |
| S10~S40: steps in controlling method of electric dust collector for vehicle | |

MODE FOR INVENTION

Hereinafter, reference will be now made in detail to an air blower device 1000 of an air-conditioning system for a vehicle having an electric dust collector 400 and a controlling method of the electric dust collector according to the preferred embodiments of the present invention with reference to the attached drawings.

Figure 1:
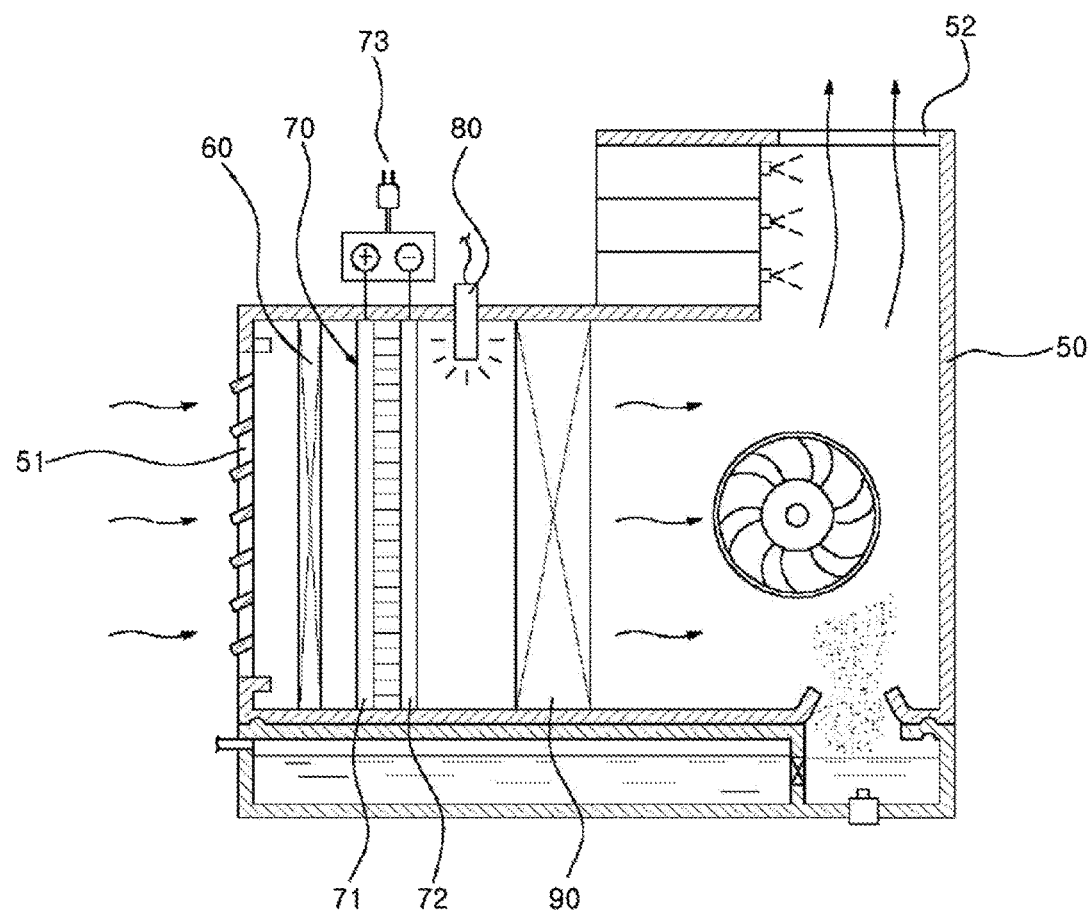
FIG. 1 is a configuration diagram of an electric dust collector according to a prior art.
Figure 2:
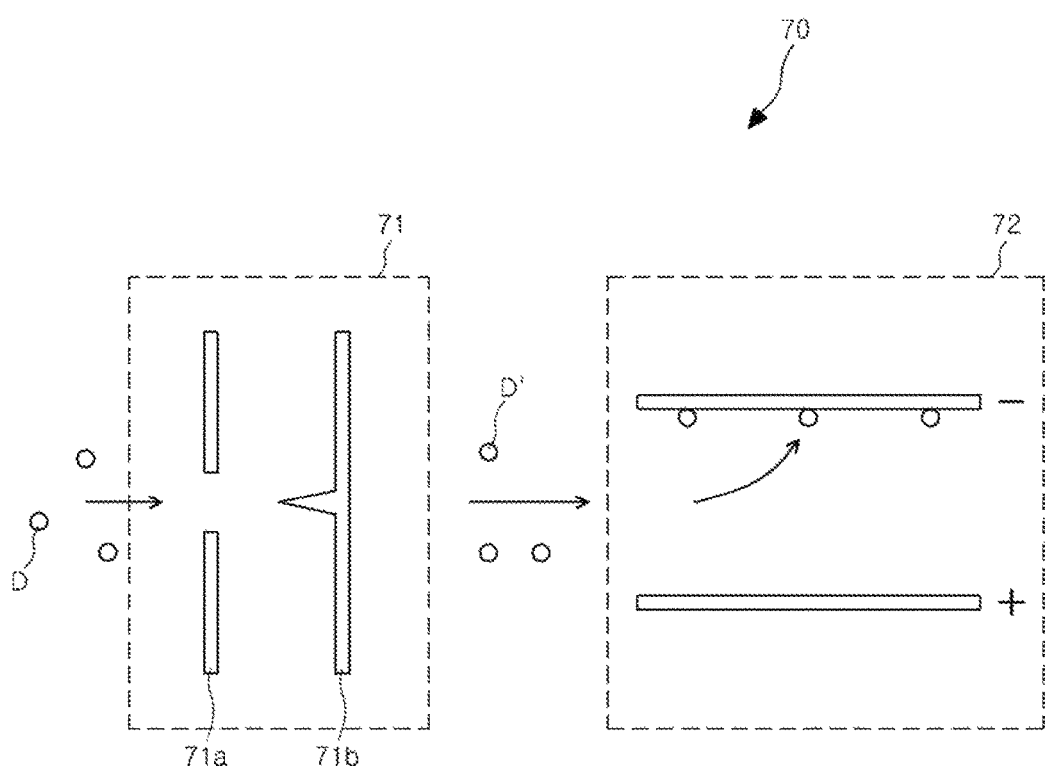
FIG. 2 is a schematic diagram for showing dust collection of an electrostatic dust collector.
Figure 3:
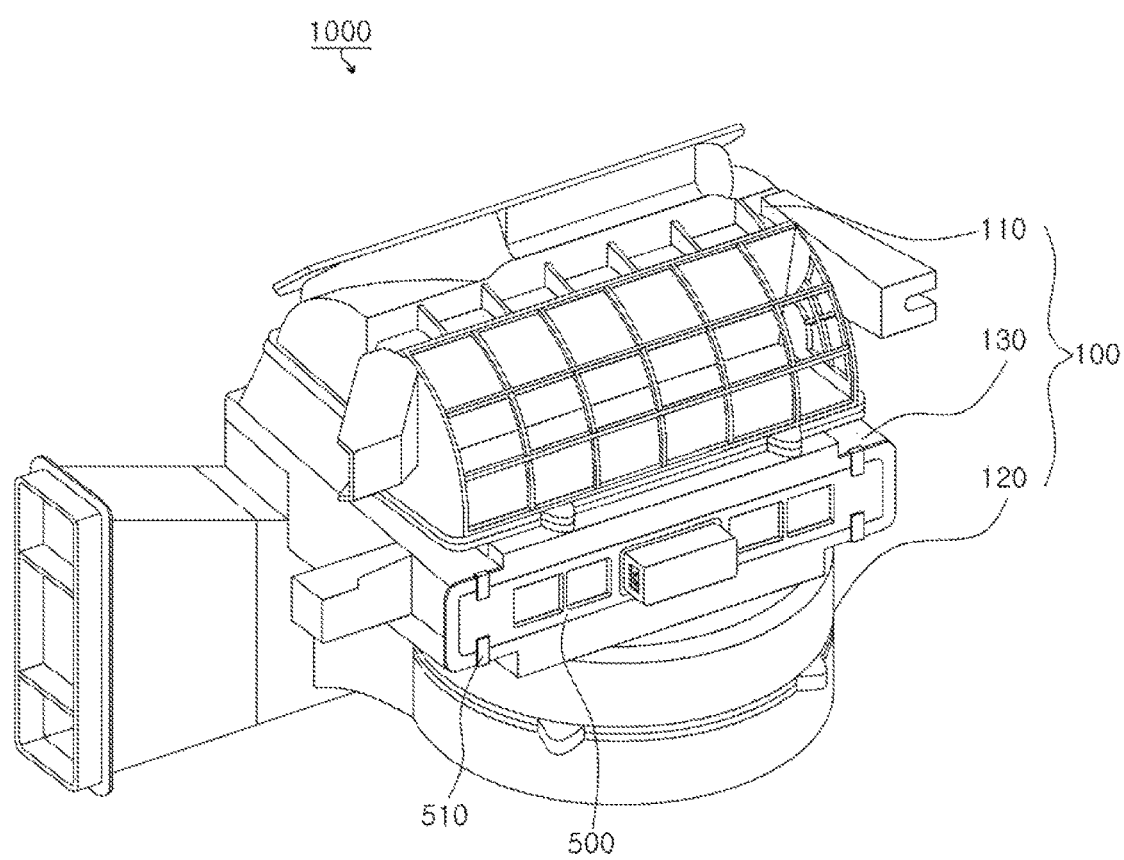
FIG. 3 is a perspective view of an air blower device of an air-conditioning system for a vehicle according to a preferred embodiment of the present invention.
Figure 4:
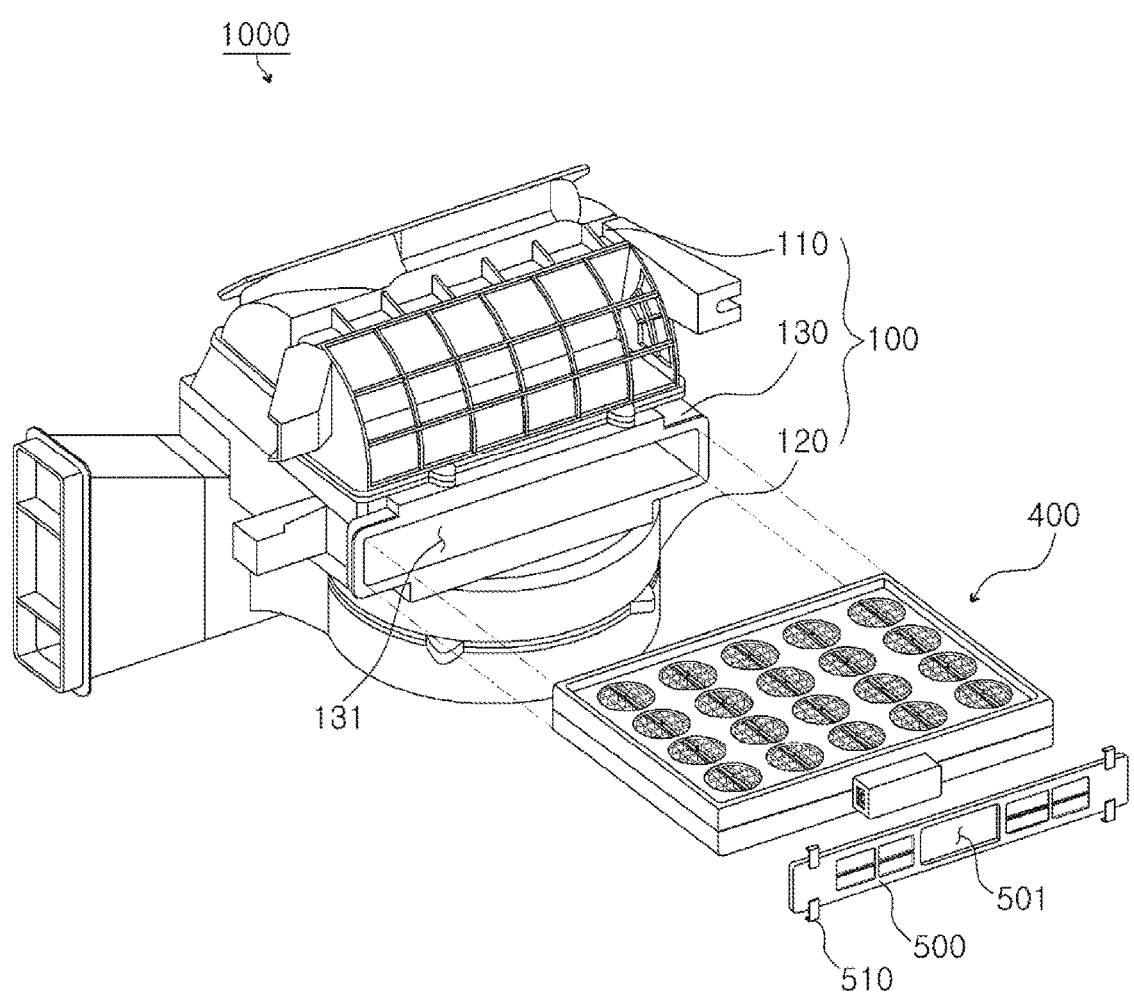
FIG. 4 is an exploded perspective view of the air blower device of FIG. 3.
Figure 5:
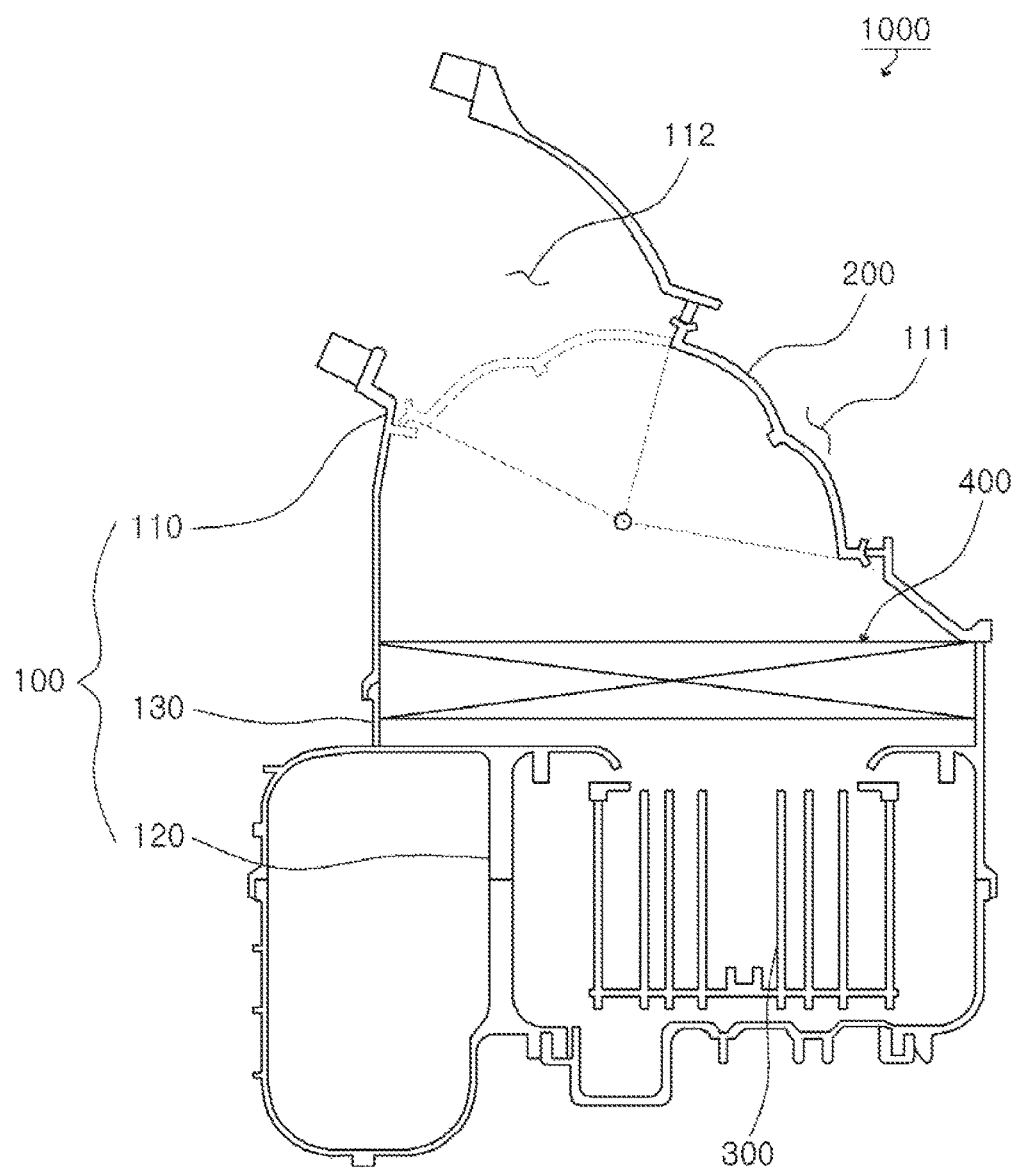
FIG. 5 is a sectional view of the air blower device of FIG. 3.

FIG. 3 is a perspective view, FIG. 4 is an exploded perspective view and FIG. 5 is a sectional view of an air blower device of an air-conditioning system for a vehicle according to a preferred embodiment of the present invention.

The air blower device 1000 of the air-conditioning system for the vehicle according to the preferred embodiment of the present invention includes a blower case 100, an indoor and outdoor air converting door 200, an air blower 300, an electric dust collector 400 and a cover 500.

The blower case 100 contains the indoor and outdoor air converting door 200, the air blower 300 and the electric dust collector 400 therein, and includes a duct part 110, an air blowing part 120 and a connection part 130.

The duct part 110 has an indoor air inlet 111 and an outdoor air inlet 112, and the indoor and outdoor air converting door 200 is disposed inside the duct part 110. The indoor air inlet 111 hollowed so that indoor air of the vehicle flows in, and the outdoor air inlet 112 is hollowed so that outdoor air flows in.

The air blower 300 is disposed inside the air blowing part 120, and is connected with an inlet of an air-conditioning case (not shown).

The connection part 130 is to connect the air blowing part 120 with the duct part 110, and the electric dust collector 400 is disposed inside the connection part 130. In this instance, the connection part 130 includes an insertion part 131 of which the certain area is hollowed so that the electric dust collector 400 is inserted and is detachably mounted.

The indoor and outdoor air converting door 200 is disposed inside the duct part 110 of the blower case 100 and rotates while drawing an arc round a driving shaft so as to selectively open and close the indoor air inlet 111 and the outdoor air inlet 112. FIG. 5 shows a state where the indoor and outdoor air converting door 200 makes flow in the outdoor air, and inflow of the indoor air is marked with dotted lines.

The air blower 300 is disposed inside the air blowing part 120 of the blower case 100 in order to forcedly blow the air. When the air flows in through the indoor air inlet 111 or the outdoor air inlet 112 by operation of the air blower 300, the air blower 300 blows the air toward an inlet of the air-conditioning case. In this instance, the air blown to the inlet of the air-conditioning case exchanges heat by heat exchangers disposed inside the air-conditioning case and is blown to the interior of the vehicle to control the indoor temperature of the vehicle.

The electric dust collector 400 is located at the connection part 130 through the insertion part 131 of the blower case 100, and a detailed form of the electric dust collector 400 will be described as follows.

The cover 500 is to open and close the insertion part 131 of the blower case 100, and has a fixing part 510 to be fixed on the blower case 100. That is, the air blower device 1000 of the air-conditioning system for the vehicle according to the present invention has several advantages in that the electric dust collector 400 is easy to be mounted and detached and the filter is easy to be replaced with a new one because the insertion part 131 of the blower case 100 can be opened and closed by the cover 500. Additionally, the air blower device 1000 of the air-conditioning system for the vehicle according to the present invention can effectively increase comfort of the vehicle by an electric dust collection filter without transformation of the existing blower case 100.

Figure 6:
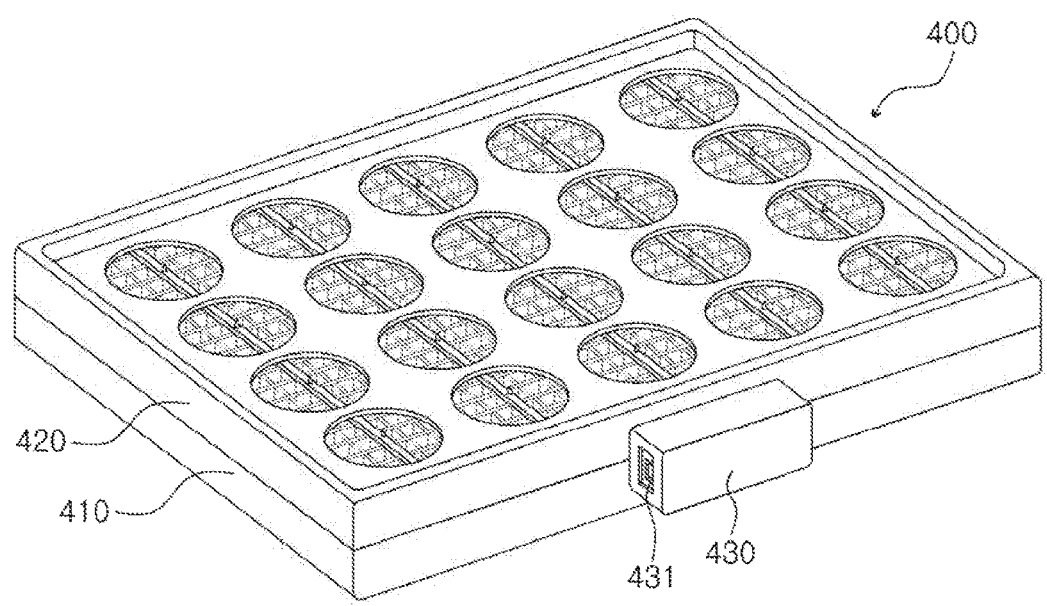
FIG. 6 is a perspective view of an electric dust collector of the air blower device of the air-conditioning system for the vehicle according to the present invention.
Figure 7:
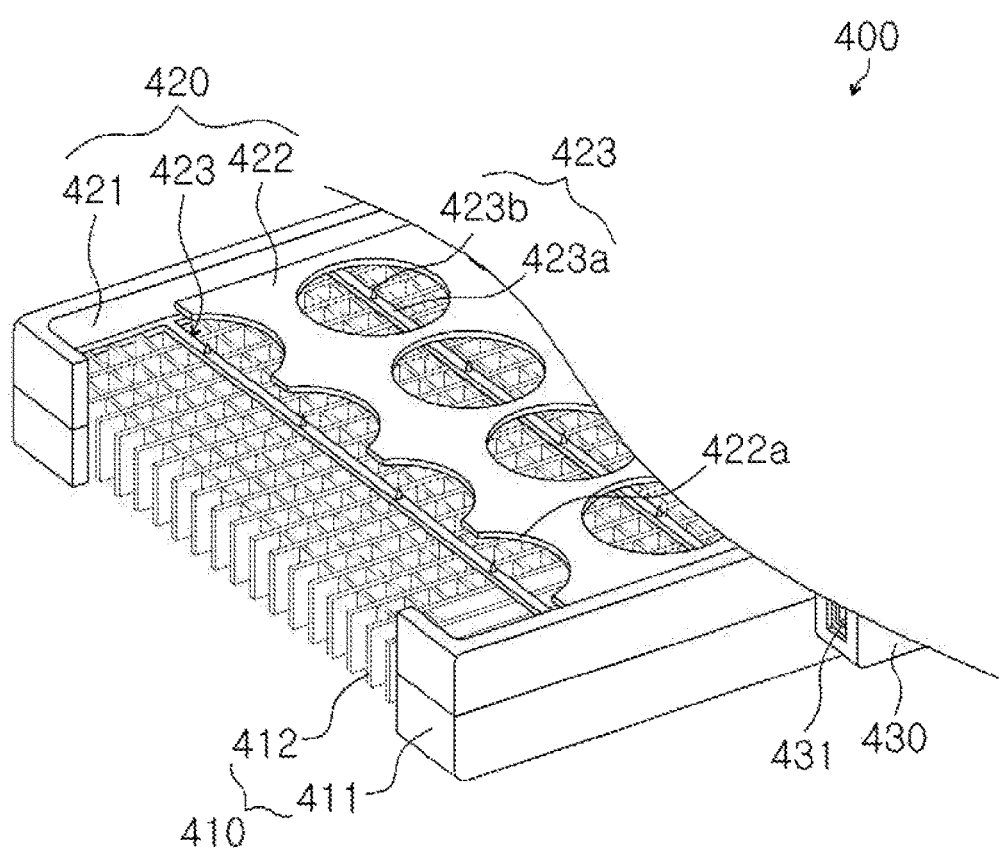
FIG. 7 is a partially sectional perspective view of the electric dust collector of FIG. 6.
Figure 8:
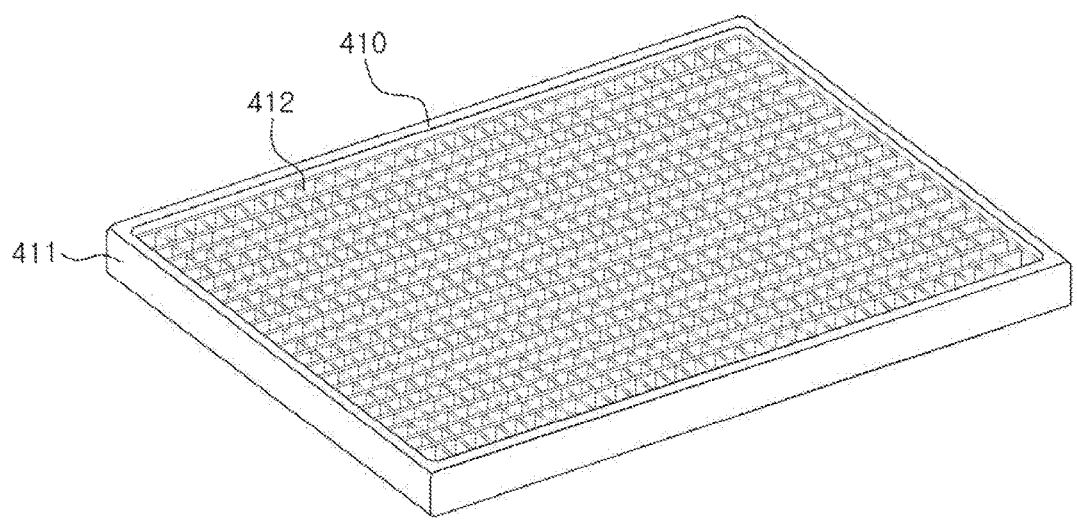
FIG. 8 is a perspective view showing a filter unit of the air blower device of the air-conditioning system.
Figure 9:
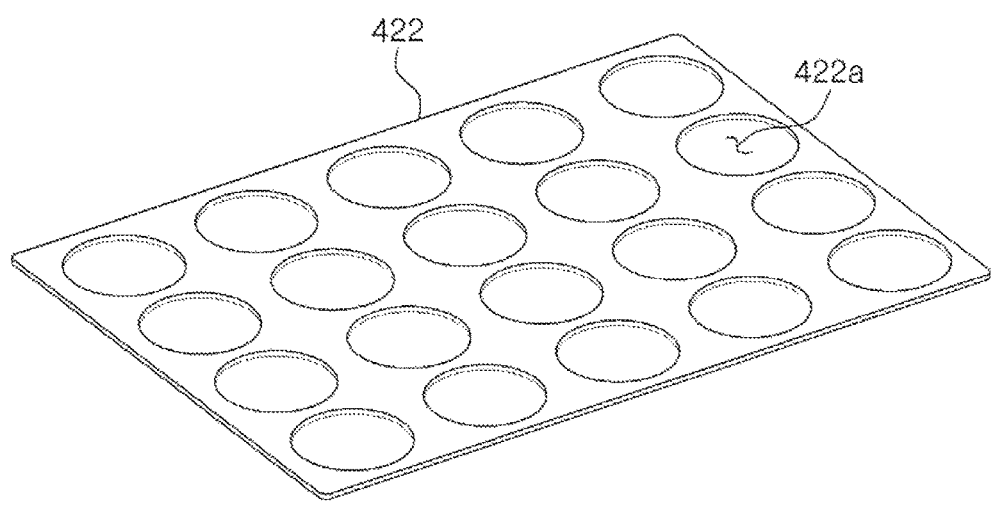
FIG. 9 is a perspective view showing a first electrode unit of the air blower device of the air-conditioning system.
Figure 10:
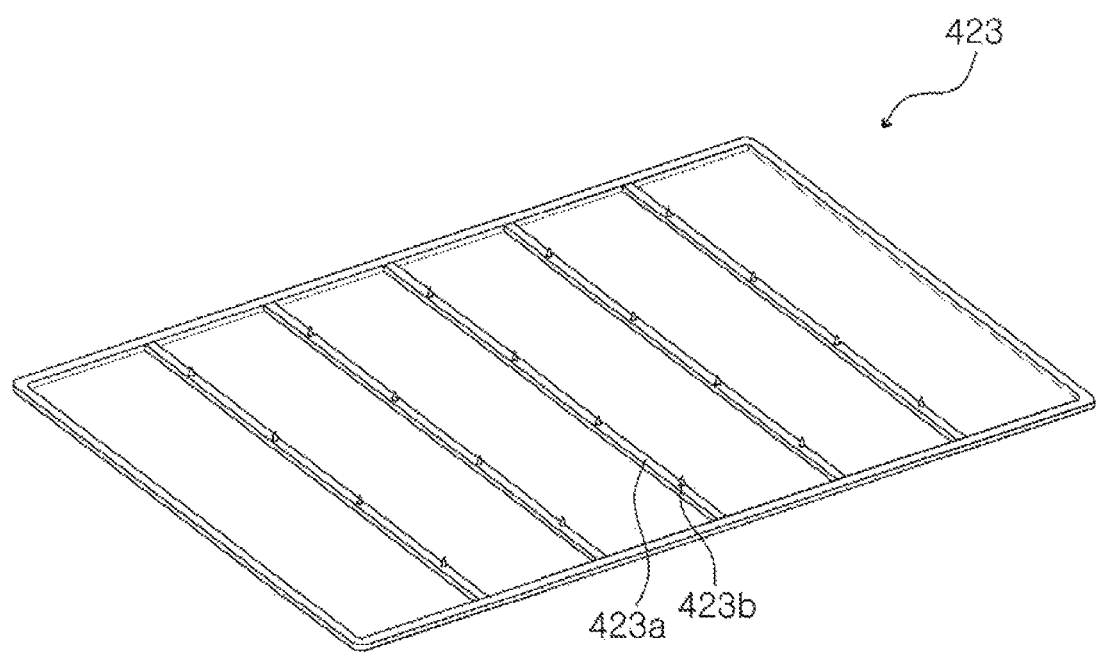
FIG. 10 is a perspective view showing a second electrode unit of the air blower device of the air-conditioning system.
Figure 11:
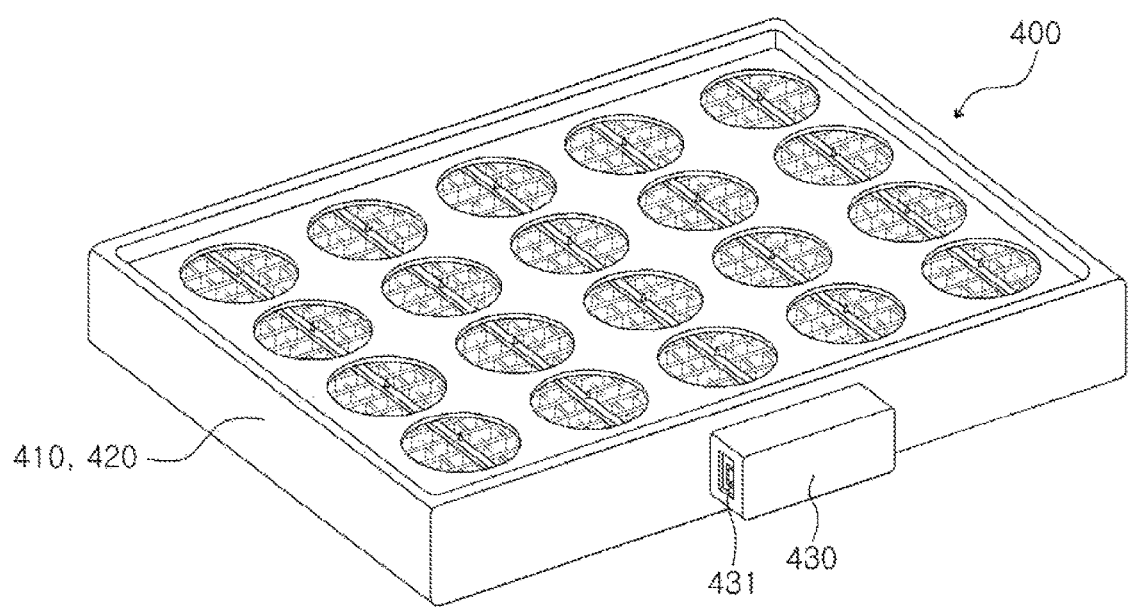
FIG. 11 is a perspective view showing another electric dust collector of the air blower device of the air-conditioning system.

FIG. 6 is a perspective view and FIG. 7 is a partially sectional perspective view of an electric dust collector of the air blower device of the air-conditioning system for the vehicle according to the present invention, FIG. 8 is a perspective view showing a filter unit of the air blower device of the air-conditioning system, FIG. 9 is a perspective view showing a first electrode unit of the air blower device of the air-conditioning system, FIG. 10 is a perspective view showing a second electrode unit of the air blower device of the air-conditioning system, and FIG. 11 is a perspective view showing another electric dust collector of the air blower device of the air-conditioning system. The electric dust collector 400 includes an electric charger unit 420, a filter unit 410 and a high voltage supply unit 430.

The electric charger unit 420 charges dust with electricity and includes an electric charger housing 421, a first electrode part 422 and a second electrode part 423.

The electric charger housing 421 is an outer member for forming the electric charger unit 420. The first electrode part 422 has a plurality of through holes 422a formed in a flat plate of a conductive material. The second electrode part 423 includes a frame 423a and an electric charge pin 423b protruding from the frame 423a toward the center of the through holes 422a of the first electrode part 422. The first electrode part 422 and the second electrode part 423 charges dust with electricity when a positive electrode and a negative electrode are applied. In more detail, when the first electrode part 422 receives high positive voltage and the second electrode part 423 receives high negative voltage, the electric charge pin 423b is located at the center of the through hole 422a of the first electrode part 422 so that an electric field is smoothly made from the electric charge pin 423a to the inner circumferential surface of the through hole 422a, thereby actively charging fine dust, which passes through the first electrode part 422 and the second electrode part 423, with electricity.

The filter unit 410 includes a filter housing 411 and a filter member 412. The filter housing 411 supports the filter member 412. The filter member 412 is formed in such a way that a plurality of dust collection plates respectively having conductive surfaces (formed by applying, coating or attaching a conductive material, are laminated in many folds) and is formed such that air can move inside the filter housing 411. In this instance, the filter member 412 is formed to transfer electric current applied from the high voltage supply unit 430 to the conductive surface.

That is, dust charged with electricity by the electric charger unit 420 is collected to the filter member 412.

The high voltage supply unit 430 supplies high voltage to the electric charger unit 420 and the filter unit 410. In this instance, a connector 431 for connecting electricity to the vehicle is formed. In this instance, the air blower device 100 of the air-conditioning case for the vehicle according to the present invention has a hollow hole 501 which is formed in such a way that a certain area of the cover 500 is hollowed so that the high voltage supply unit 430 protrudes to the outside of the blower case 100. Accordingly, the air blower device 100 of the air-conditioning case for the vehicle according to the present invention can easily connect power supply to the high voltage supply unit 430 without transformation of the existing blower case 100.

The high voltage supply unit 430 can supply high voltage to the electric charger unit 420 and the filter unit 410 and apply high voltage to another high voltage using units. In other words, the high voltage supply unit 430 can simplify configuration of vehicle parts because applying high voltage to units requiring high voltage, for instance, an anion generator, as well as being used for the electric dust collector 400.

In FIG. 11, the electric dust collector 400 has the above-mentioned structure and includes the filter housing 411 and the electric charger housing 421 which are formed integrally.

Figure 12:
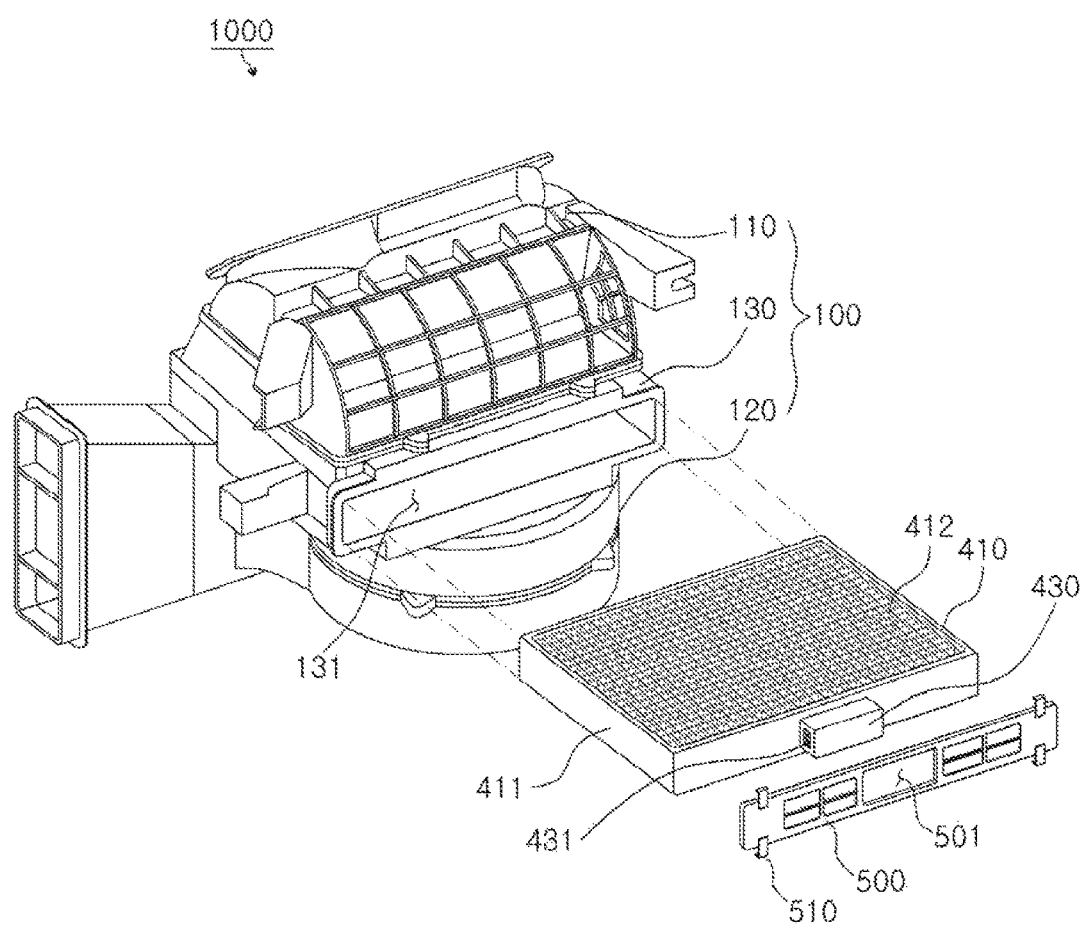
FIG. 12 is an exploded perspective view of an air blower device of an air-conditioning system for a vehicle according to another preferred embodiment of the present invention.
Figure 13:
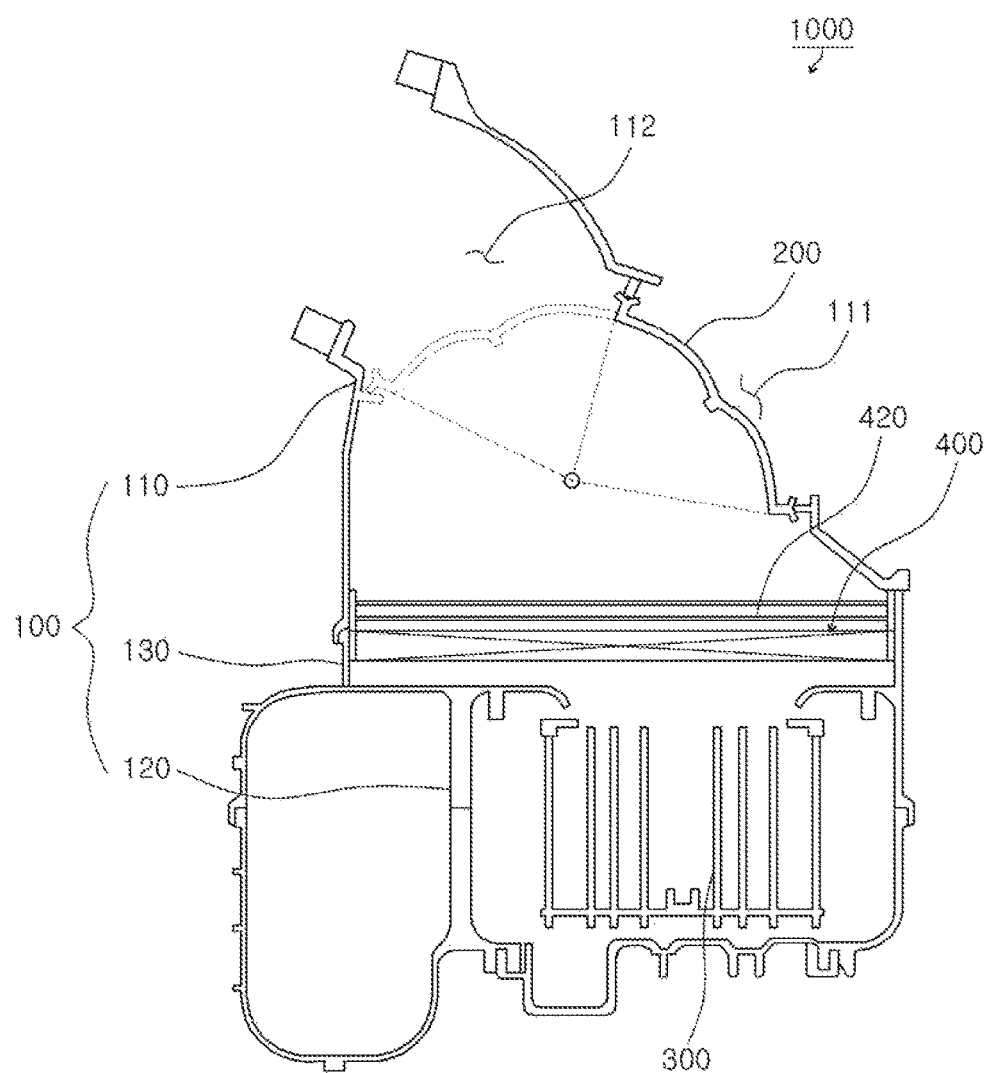
FIG. 13 is a sectional view of the air blower device of FIG. 12.

In the meantime, FIG. 12 is an exploded perspective view and FIG. 13 is a sectional view of an air blower device of an air-conditioning system for a vehicle according to another preferred embodiment of the present invention. In FIGS. 12 and 13 illustrating the air-conditioning system for the vehicle according to the second preferred embodiment of the present invention, an electric charger unit 420 is mounted in a blower case 100, and an electric dust collector 400 includes: a filter unit 410 for collecting dust charged with electricity through the electric charger unit 420; and a high voltage supply unit 430 for applying high voltage to the electric charger unit 420 and the filter unit 410. In this instance, the electric charger unit 420 includes a first electrode part 422 and a second electrode part 423. The electric charger housing 421 may be the blower case 100 or may be mounted on the blower case 100. The first electrode part 422 and the second electrode part 423 have the above-mentioned characteristics.

Figure 14:
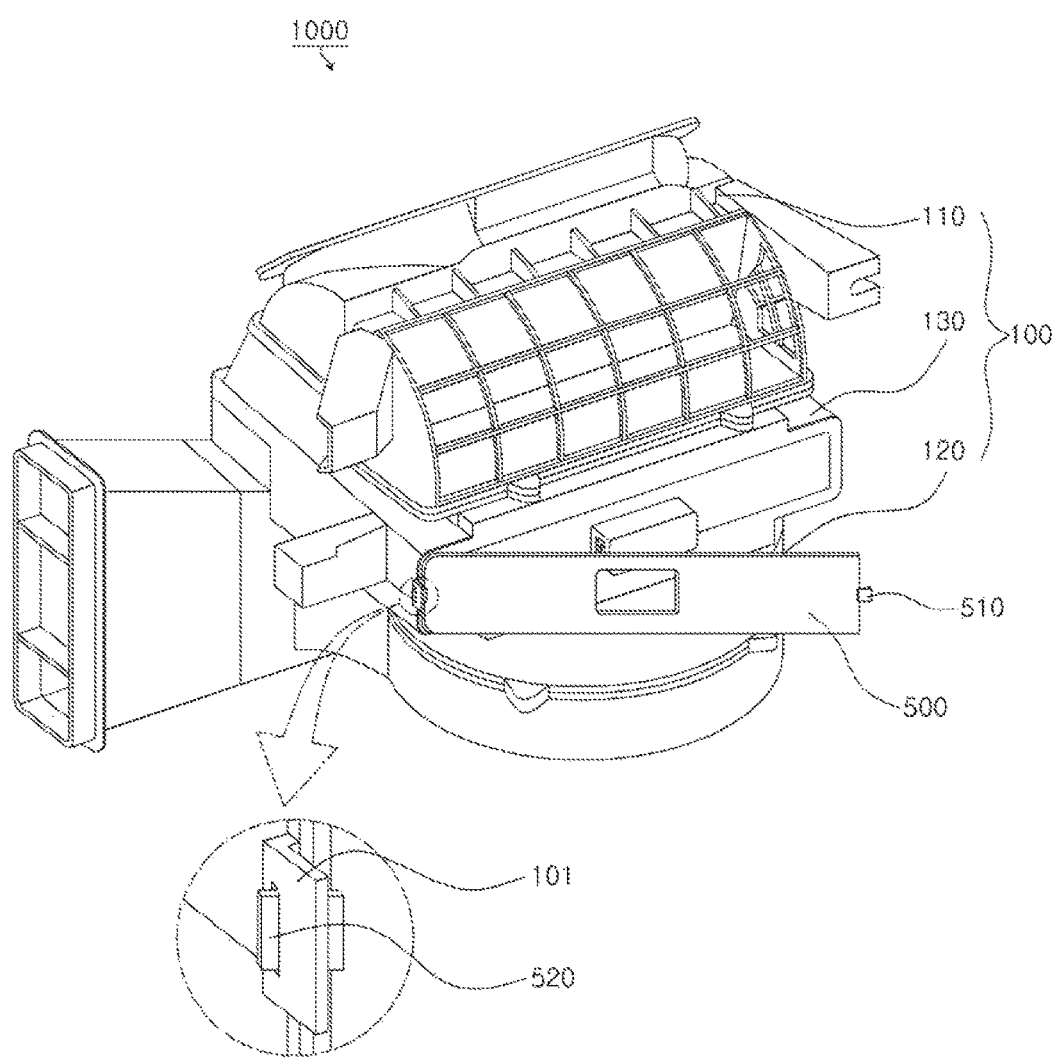
FIG. 14 is a view of an air blower device of an air-conditioning system for a vehicle according to a further preferred embodiment of the present invention.
Figure 15:
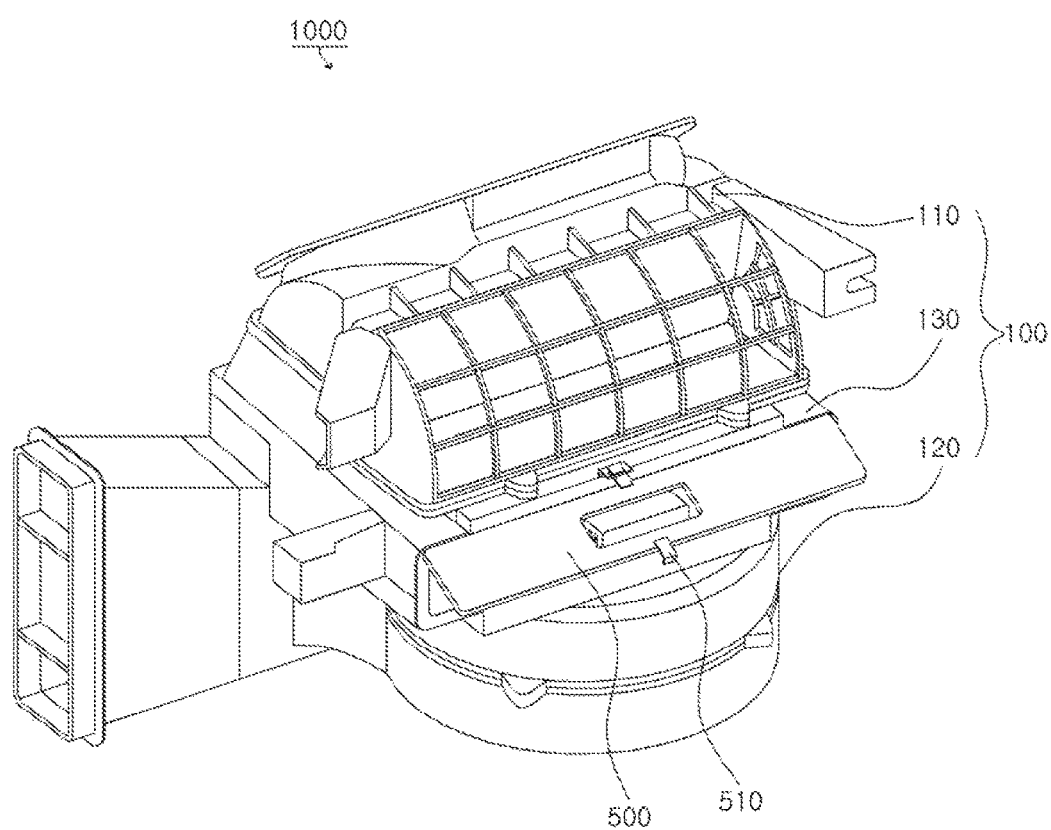
FIG. 15 is another view of the air blower device of FIG. 14.

Moreover, FIGS. 14 and 15 are views of an air blower device of an air-conditioning system for a vehicle according to a further preferred embodiment of the present invention. FIGS. 14 and 15 illustrate an example that four fixing parts 510 are formed and fixed on a cover 500. In FIGS. 14 and 15, a coupling hole 101 is formed at one side of a blower case 100, a protrusion part 520 is formed at one side of the cover 500 in correspondence with the coupling hole 101 and the fixing parts 10 are formed at the other side of the blower case 100 or at the cover 500 so that the blower case 100 and the cover 500 are fixed to each other by the fixing part 510 when the protrusion part 520 of the cover rotates on an axis of a portion where the protrusion part 520 is inserted into the coupling hole 101. Particularly, FIG. 14 illustrates an example that the coupling hole 101 is formed at the left side of the blower case 100 and the protrusion part 520 corresponding to the coupling hole 101 is formed at the left side of the cover 500. Additionally, FIG. 15 illustrates an example that the coupling hole 101 is formed at the upper portion of the blower case 100, the protrusion part 520 corresponding to the coupling hole 101 is formed at the upper portion of the cover 500 and the fixing part 510 is formed at the other side of the cover 500. The fixing part 510 may adopt a hook type or one of various fixing ways, and may adopt one of various fixing means which is formed on at least one of the blower case 100 and the cover 500.

Figure 16:
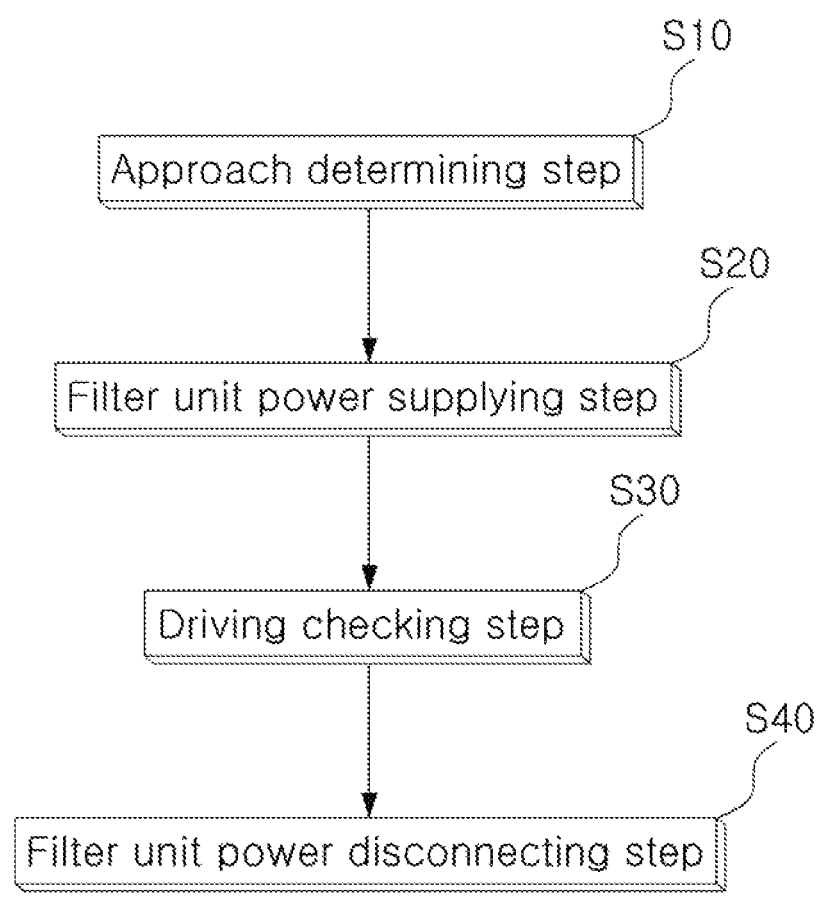
FIG. 16 is a flow chart of a controlling method of an electric dust collector for a vehicle according to a preferred embodiment of the present invention.
Figure 17:
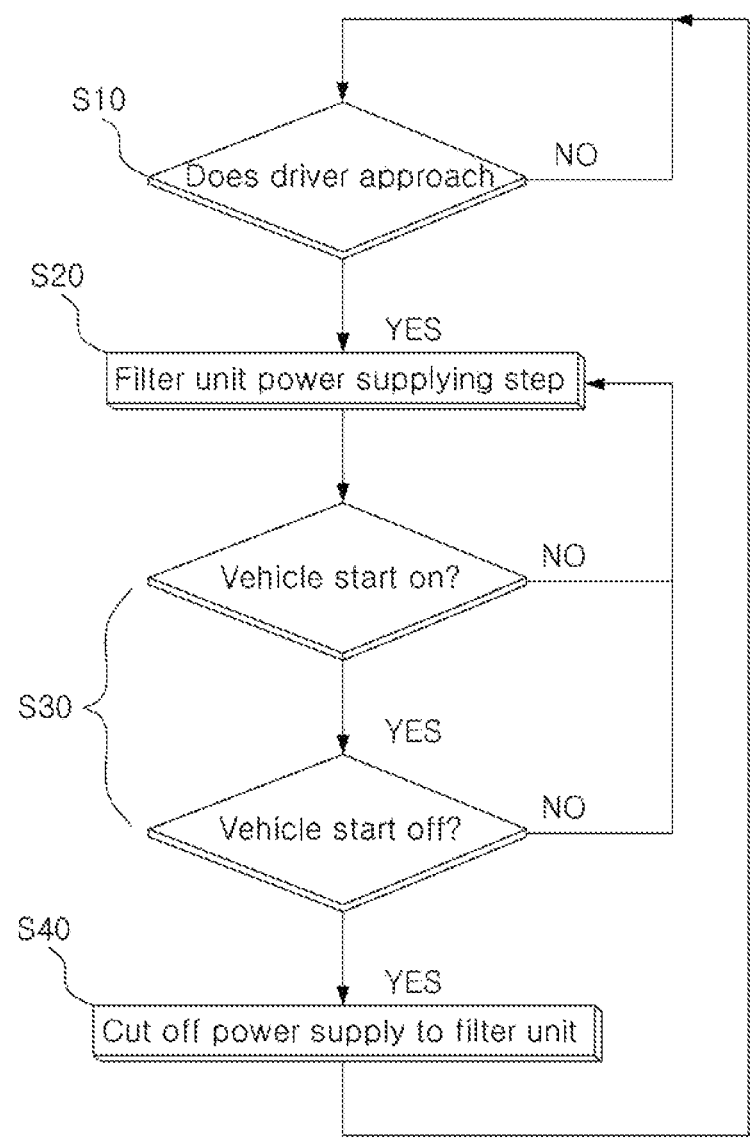
FIG. 17 is another flow chart of the controlling method of the electric dust collector of FIG. 16.
Figure 18:
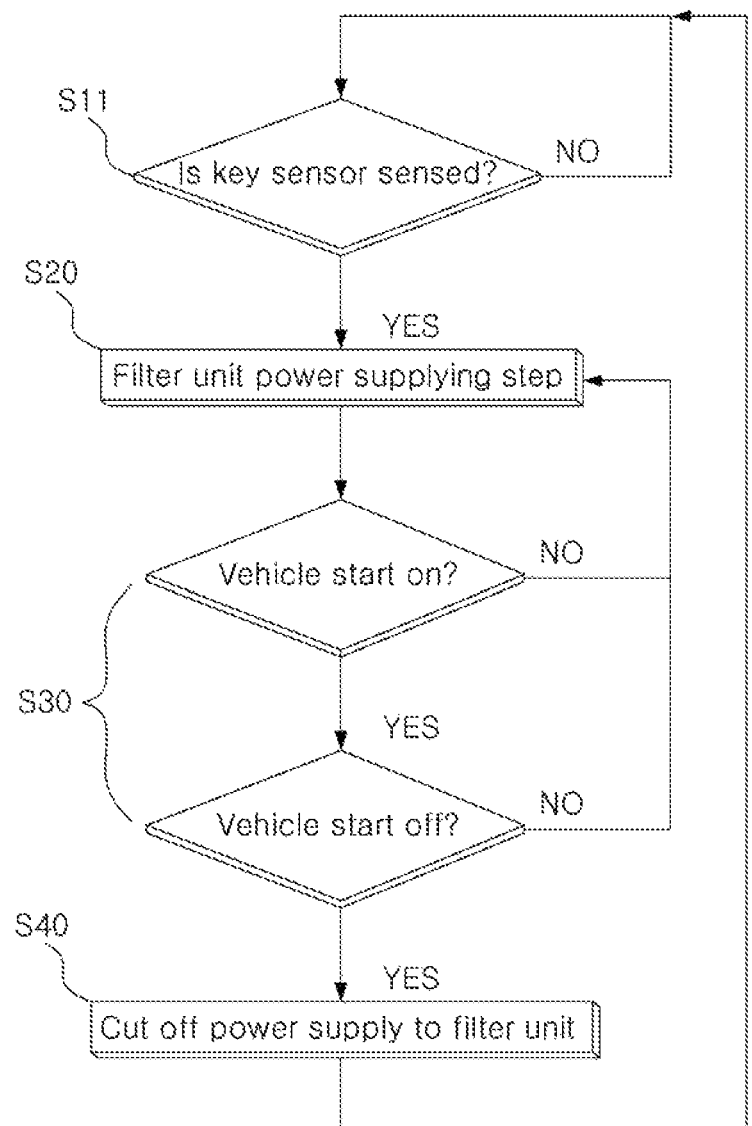
FIG. 18 is a flow chart of a controlling method of an electric dust collector for a vehicle according to another preferred embodiment of the present invention.
Figure 19:
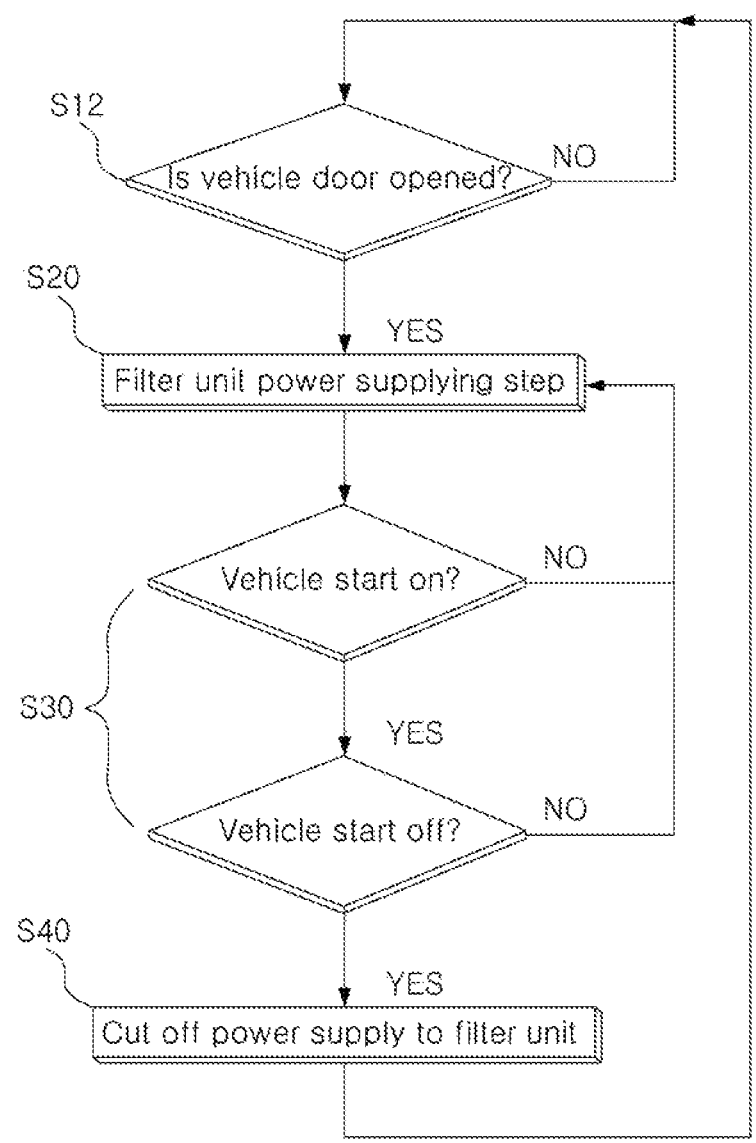
FIG. 19 is a flow chart of a controlling method of an electric dust collector for a vehicle according to a further preferred embodiment of the present invention.

FIGS. 16 and 17 are flow charts of a controlling method of an electric dust collector for a vehicle according to a preferred embodiment of the present invention, FIG. 18 is a flow chart of a controlling method of an electric dust collector for a vehicle according to another preferred embodiment of the present invention, and FIG. 19 is a flow chart of a controlling method of an electric dust collector for a vehicle according to a further preferred embodiment of the present invention.

The controlling method of the electric dust collector for the vehicle according to the present invention relates to a method of controlling the electric dust collector 400 contained in the air blower device 1000 of the air-conditioning system for the vehicle mentioned above, and includes a step (S10) of determining a driver's approach and a step (S20) of supplying electric power to the filter unit.

The approach determining step (S10) is the step of determining whether or not the driver approaches the vehicle in a state where the vehicle is stopped or stalls. That is, the approach determining step (S10) is the step for sensing that the driver approaches the vehicle in order to drive the vehicle. The approach determining step (S10) is carried out before the driver starts an engine after getting into the vehicle, namely, before the air-conditioning system starts operation.

As shown in FIG. 18, the approach determining step (S10) includes the steps of: (S11) determining that the driver approaches the vehicle when a key sensor disposed on the vehicle is sensed; and (S12) determining that the driver approaches the vehicle when a vehicle door is opened as shown in FIG. 19.

The filter unit power supplying step (S20) is the step of supplying electric power to the filter unit 410 when the driver's approach is determined in the approach determining step (S10). The filter unit power supplying step (S20) continues while the vehicle is running.

In other words, the controlling method of the electric dust collector for the vehicle according to the present invention determines the driver's approach before the vehicle is started, namely, before the air-conditioning system (the air blowing part 120) is operated and supplies electric power to the filter unit 410 of the electric dust collector 400 so that the dust collected to the filter unit 410 can be in a stuck state. Because the air blowing part 120 is operated before electric power is supplied to the filter unit 410, the dust collected to the filter unit 410 is detached from the filter unit not to be supplied to the interior of the vehicle so that the controlling method of the electric dust collector can enhance a passenger's comfort more.

Furthermore, the controlling method of the electric dust collector for the vehicle according to the present invention further includes a driving checking step (S30) and a filter unit power disconnecting step (S40).

The driving checking step (S30) is the step of checking a running state and a stop state of the vehicle after the filter unit power supplying step (S20). The running state and the stop state of the vehicle may be checked through a start-up state or RPM information of the vehicle, and the driving checking step (S30) may be carried out through an electronic control unit (ECU) of the vehicle.

The filter unit power disconnecting step (S40) is the step of disconnecting electric power supplied to the filter unit 410 when it is checked that the vehicle is stopped after running in the driving checking step (S30).

After the filter unit power disconnecting step (S40), when the driver moves outside the vehicle (it can be checked through a vehicle door locked state), the approach determining step (S10) is carried out again.

In other words, the controlling method of the electric dust collector for the vehicle according to the present invention determines the driver's approach before the air blowing part 120 is operated after the driver gets on, supplies electric power to the filter unit 410 of the electric dust collector 400, and then, cuts off power supply to the filter unit 410 when the vehicle is stopped after running so as to prevent that the dust stuck on the filter unit 410 of the electric dust collector 400 is supplied to the interior of the vehicle, thereby enhancing comfort of the vehicle.

While the present invention has been particularly shown and described with reference to exemplary embodiments thereof, it will be understood by those of ordinary skill in the art that the present invention is not limited to the embodiments and various changes in form and details may be made therein without departing from the spirit and scope of the present invention as defined by the following claims.

The invention claimed is:

1. An air blower device of an air-conditioning system for a vehicle comprising:
   a blower case including a duct part having an indoor air inlet and an outdoor air inlet, an air blowing part connected with an inlet of an air-conditioning case, and a connection part connecting the duct part with the air blowing part, the connection part having an insertion part with a hollow area;
   an indoor and outdoor air converting door disposed inside the duct part of the blower case to open and close the indoor air inlet and the outdoor air inlet;
   an air blower disposed inside the air blowing part of the blower case to forcedly blow air;
   an electric dust collector located at the connection part through the insertion part of the blower case, the electric dust collector comprising:
      an electric charger unit;
      a filter unit collecting dust charged with electricity through the electric charger unit; and
      a high voltage supply unit applying high voltage to the electric charger unit and the filter unit; and
   a cover opening and closing the insertion part of the blower case, wherein the cover includes a hollow hole aligned with the hollow area to permit the high voltage supply unit of the electric dust collector to protrude outside of the blower case.

2. An air blower device of an air-conditioning system for a vehicle comprising:
   a blower case including a duct part having an indoor air inlet and an outdoor air inlet, an air blowing part connected with an inlet of an air-conditioning case, and a connection part connecting the duct part with the air blowing part, the connection part having an insertion part with a hollow area;

an indoor and outdoor air converting door disposed inside the duct part of the blower case to open and close the indoor air inlet and the outdoor air inlet;

an air blower disposed inside the air blowing part of the blower case to forcedly blow air;

an electric dust collector located at the connection part through the insertion part of the blower case, the electric dust collector comprising:

an electric charger unit;

a filter unit collecting dust charged with electricity through the electric charger unit;

a high voltage supply unit applying high voltage to the electric charger unit and the filter unit;

an electric charger housing;

a first electrode part mounted inside the electric charger housing, the first electrode part having a plurality of through holes formed in a flat board of a conductive material; and a second electrode part mounted inside the electric charger housing spaced apart from the first electrode part; and a cover opening and closing the insertion part of the blower case.

3. An air blower device of an air-conditioning system for a vehicle comprising:

a blower case including a duct part having an indoor air inlet and an outdoor air inlet, an air blowing part connected with an inlet of an air-conditioning case, and a connection part connecting the duct part with the air blowing part, the connection part having an insertion part with a hollow area;

an indoor and outdoor air converting door disposed inside the duct part of the blower case to open and close the indoor air inlet and the outdoor air inlet;

an air blower disposed inside the air blowing part of the blower case to forcedly blow air;

an electric charger unit mounted on the blower case, the electric charger unit comprising:

an electric charger housing;

a first electrode part mounted inside the electric charger housing; and a second electrode part mounted inside the electric charger housing spaced apart from the first electrode part;

an electric dust collector located at the connection part through the insertion part of the blower case, the electric dust collector comprising a filter unit collecting dust charged with electricity through the electric charger unit and a high voltage supply unit applying high voltage to the electric charger unit and the filter unit; and a cover opening and closing the insertion part of the blower case, wherein the cover includes a hollow hole aligned with the hollow area to permit the high voltage supply unit of the electric dust collector to protrude outside of the blower case.

4. The air blower device according to claim 1, wherein the air blower device of the air-conditioning system for the vehicle further comprises a fixing part formed on the blower case or the cover to fix the blower case and the cover to each other.

5. The air blower device according to claim 3, the air blower device of the air-conditioning system for the vehicle further comprising:

a coupling hole formed at a first side of the blower case;

a protrusion part formed at a first side of the cover to correspond with the coupling hole; and a fixing part formed at a second side of the blower case or a second side of the cover, to fix the blower case and the cover to each other by the fixing part when the protrusion part of the cover rotates on an axis of a portion where the protrusion part is inserted into the coupling hole.

6. The air blower device according to claim 1, the filter unit further comprising:

a filter housing; and a filter member formed so a plurality of dust collection plates respectively having conductive surfaces are laminated in a plurality of folds and air can move inside the filter housing.

7. The air blower device according to claim 2, the second electrode part further comprising:

a frame; and an electric charge pin protruding from the frame toward a center of the through holes of the first electrode part.

8. The air blower device according to claim 1, wherein the filter unit includes a filter housing and a filter member formed to include a plurality of dust collection plates respectively having conductive surfaces and arranged wherein air can move inside the filter housing; and wherein the electric charger unit includes an electric charger housing, a first electrode part mounted inside the electric charger housing, and a second electrode part mounted inside the electric charger housing spaced apart from the first electrode part, wherein the filter housing and the electric charger housing are formed integrally.

9. The air blower device according to claim 1, wherein the high voltage supply unit has a connector for connecting electric power to the vehicle.

10. The air blower device according to claim 1, wherein the high voltage supply unit applies high voltage to another high voltage device mounted in the vehicle.

11. The air blower device according to claim 3, the filter unit further comprising:

a filter housing; and a filter member formed to include a plurality of dust collection plates respectively having conductive surfaces and arranged wherein air can move inside the filter housing.

12. The air blower device according to claim 1, the electric charger unit further comprising:

an electric charger housing;

a first electrode part mounted inside the electric charger housing; and a second electrode part mounted inside the electric charger housing spaced apart from the first electrode part.

* * * * *